United States Patent [19]

Borrelli et al.

[11] Patent Number: 5,062,877
[45] Date of Patent: Nov. 5, 1991

[54] METHOD FOR MAKING AN OPTICAL DEVICE

[75] Inventors: Nicholas F. Borrelli, Elmira; Dennis W. Smith, Corning, both of N.Y.

[73] Assignee: Corning Incorporated, Corning, N.Y.

[21] Appl. No.: 506,078

[22] Filed: Apr. 9, 1990

Related U.S. Application Data

[63] Continuation-in-part of Ser. No. 432,160, Nov. 6, 1989, abandoned.

[51] Int. Cl.$^5$ .............................................. C03C 10/10
[52] U.S. Cl. ...................................... 65/30.13; 65/33; 156/84; 350/167; 428/426; 355/237; 359/620; 359/900
[58] Field of Search ................. 65/30.13, 33; 350/167; 156/84; 428/426

[56] References Cited

U.S. PATENT DOCUMENTS

| | | | |
|---|---|---|---|
| 2,628,160 | 2/1953 | Stookey | 65/31 X |
| 3,674,444 | 10/1973 | Simmons | 65/33 X |
| 3,749,561 | 7/1973 | Kuwayama | 65/33 |
| 4,518,222 | 5/1985 | Borelli et al. | 65/33 X |
| 4,572,611 | 2/1986 | Bellman et al. | 65/33 X |

*Primary Examiner*—Robert L. Lindsay
*Attorney, Agent, or Firm*—C. S. Janes, Jr.

[57] ABSTRACT

This invention is directed to a method of forming optical devices composed of a photonucleable, crystallizable, lithium silicate glass body having at least one glass lens integral with and rising above at least one surface thereof, the lens being surrounded by a crystallized glass matrix, and optical devices produced by such method. The inventive method comprises subjecting the crystallized body to an ion exchange reaction wherein sodium and/or potassium ions from an external source are exchanged for lithium ions within the surface of the glass lens, the exchange reaction being conducted at a temperature of about 25°–125° C. above the annealing point of the glass for a time sufficient to produce a lens having an axial height in excess of 100% greater than that of lenses produced solely by selectively crystallizing a photonucleable, lithium silicate glass body.

14 Claims, No Drawings

METHOD FOR MAKING AN OPTICAL DEVICE

This is a Continuation-In-Part of application Ser. No. 07/432,160, filed Nov. 6, 1989 now abandoned.

BACKGROUND OF THE INVENTION

U.S. Pat. No. 2,628,160 (Stookey) discloses photonucleable glasses that are capable of being chemically sculptured. That is, the glasses disclosed in that patent are susceptive to the development of opacification in selected zones thereof due to the generation of crystals therein via the selective radiation of those zones by shortwave (conveniently ultraviolet) radiation followed by heat treatment. The patent notes that the great difference in solubility existing between the crystal phase and the precursor, i.e., uncrystallized, glass results in the ready leaching of the crystalline regions from the zones of glass.

U.S. Pat. No. 4,572,611 (Bellman et al.) discloses an optical device founded upon the glass compositions described in U.S. Pat. No. 2,628,160. Thus, Bellman et al. observed a particular phenomenon which occurs in the selectively opacifiable glasses described in that patent. They noted that differential densification of the glass occurs during the photonucleating and crystal generating process. Hence, the crystal-containing areas contract and thereby become denser when compared to the transparent, crystal-free (glass) areas which do not undergo change. That contraction results in the formation of a physically raised pattern having an unbroken surface. Bellman et al. found that the configuration of that raised portion, termed by them a "relief image," could be controlled by adjusting the initial radiation exposure of the glass, and so provided the opportunity for producing an optical pattern in the glass.

Hence, as explained in that patent, Bellman et al. employed an otherwise transparent mask having a pattern of opaque dots corresponding to a desired lens array. That is, the mask is transparent to the activating actinic radiation (commonly ultraviolet radiation), except for the pattern of dots which are opaque to the actinic radiation. Accordingly, where the glass is exposed through the mask, the exposed zones become nucleated, whereas the cylindrical areas under the dots are not exposed and, hence, are not nucleated. When the glass is subsequently heat treated to cause the growth of crystals in the exposed zones, the resultant crystal-containing zones contract and draw away from the unexposed, uncrystallized cylindrical areas. Surface tension causes the transparent areas to become raised protrusions which assume spherical shapes such that the glass article appears to have raised spherical surfaces with interstitial valleys.

Bellman et al. observed that any of the photosensitively opacifiable glasses described in U.S. Pat. No. 2,628,160 were operable in their invention and incorporated that patent in their disclosure for that teaching. That patent disclosed glasses wherein the crystal phases developed therein were selected from the group of lithium disilicate, lithium metasilicate, barium disilicate, and alkali metal fluoride. Nevertheless, because a lithium silicate photosensitively opacifiable glass was commercially available from Corning Glass Works (now Corning Incorporated) under Code 8603, Bellman et al. used it in their work.

U.S. Pat. No. 4,518,222 (Borrelli et al.) describes a modification/improvement upon the disclosure of U.S. Pat. No. 4,572,611. Thus, Borrelli et al. discovered that the characteristics displayed by the optical devices prepared in accordance with the method of Bellman et al. utilizing lithium-containing glasses could be altered by subjecting the devices to an ion exchange reaction wherein larger alkali metal ions, conveniently $Na^+$ and/or $K^+$ ions, from an external source are exchanged with $Li^+$ ions in the glass. This ion exchange process produces both axial and radial concentrations of alkali metal ions in the lenses. That is, the level of $Li^+$ ions within a surface layer of the lenses is less than that present in the interior of the lenses, and the level of exchangeable larger alkali metal ions is greater within the surface layer than that present in the interior of the lenses, with the distribution of the alkali metal ions being defined by both axial and radial concentration gradients. Such gradients, in turn, generate refractive index and dispersion gradients. Through careful control of those gradients, it is possible to correct aberrations in lens systems.

Borrelli et al. also discovered that, if the ion exchanged zone was heated to a temperature above the strain point of the glass, the optical power of the lenses could be significantly increased. The physical effect of the heat treatment was to release stress and thereby permit reshaping of the lenses.

The presence of the concentration gradients was found to be independent of whether the optical device had been heated above the strain point of the glass to relax induced stresses and alter the physical profile of the lenses (and hence increase their strengths). Inasmuch as the time necessary for stress relaxation is short compared with typical ion exchange reaction times, little effect on the concentration gradients results from the exposure to the high temperature. Consequently, it was possible to alternate various ion exchange treatments, above and below the strain point of the glass, with heat treatments above the strain point. Such modifications in processing variables permit the formation of lenses having desirable combinations of physical lens profile and concentration gradient.

The basic discovery of Borrelli et al. was that the ion exchange reaction can exert a substantive effect in reducing the radius of curvature of the lenses. That reduction, in turn, increases the optical power or strength of the lenses. No change in optical strength takes place unless the glass is heated above the glass strain point. Thus, the glass relaxes to an essentially stress-free state while the change in lens curvature occurs.

Borrelli et al. observed that the ion exchange reaction was effective to produce the beneficial changes in the lenses because the reaction proceeded more rapidly in the glass lenses than in the surrounding crystalline regions. Thus, little, if any, ion exchange takes place in the crystals.

Because where the ion exchange reaction is carried out at temperatures below the strain point of the glass the glass must thereafter be heated above its strain point, the preferred practice of Borrelli et al. was to conduct the ion exchange reaction at a temperature slightly above the strain point of the glass. Thus, the patentees employed temperatures of about 10°-35° C. above the strain point of the glass, i.e., temperatures up to about the annealing point thereof.

Inasmuch as U.S. Pat. No. 4,518,222 describes in considerable detail the process of, and the mechanisms involved in, ion exchange reactions in the development of lens arrays, the entire disclosure of that patent is incorporated herein by reference.

Microlens arrays have been produced commercially utilizing the disclosures of Bellman et al. and Borrelli et al. A significant limitation acting to curtail wider application of such arrays has been the inability to produce relatively short focal lengths in lenses having diameters of about 1–2 mm; i.e., lenses having focal lengths useful for applications requiring high numerical apertures. For example, in lenses having a diameter of 1 mm and larger, it has not been possible to decrease the radius of curvature sufficiently to produce axial heights therein of about 20 microns.

Accordingly, the primary objective of the present invention was to devise a method for forming optical devices composed of a photonucleable, crystallizable, lithium silicate glass body having at least one clear glass lens integral with and rising above at least one surface, said lens being surrounded by a crystallized glass matrix and having an axial height above the glass surface in excess of 100% greater than that present in the lenses produced by Bellman et al.

Another objective of the present invention was to devise means for producing lens arrays from photonucleable, crystallizable, lithium silicate glass bodies which had been exposed to short wave radiations in predetermined areas, heat treated to develop crystals in the exposed areas, and then ground and polished flat on one or both surfaces.

SUMMARY OF THE INVENTION

We have found that those objectives and others which will become apparent from the following description can be achieved via the method set out below:

(a) a photonucleable, crystallizable lithium silicate glass body is selectively exposed to short wave radiation, commonly ultraviolet radiation;

(b) said glass body is thereafter heat treated to crystallize the glass body in those areas previously exposed to short wave radiation; and then (c) said glass body is subjected to an ion exchange reaction wherein sodium and/or potassium ions from an external source are exchanged with lithium ions within the surface of those areas of said glass body not exposed to short wave radiation, said ion exchange reaction being conducted at a temperature at least 25° C. above the annealing point of said glass to provide an array of spherically-shaped clear lenses integral with and arising above the surface of said glass body to an axial height at least 100% greater than the axial height of the lenses prior to the ion exchange reaction. Furthermore, each lens is characterized by a layer extending below the lens surface wherein the lithium ion content is below the glass composition norm with a corresponding increase in sodium and/or potassium ion content. The inventive method has made it possible to produce lenses having diameters of 1 mm and larger having axial heights in excess of 20 microns.

In general, the period of ion exchange reaction is dependent upon the temperature employed and the ions being exchanged. Hence, at temperatures of about 25° C. above the annealing point of the glass, a reaction time of two hours may be adequate for the exchange of $Na^+$ ions for $Li^+$ ions, whereas at least 48 hours and frequently longer may be required for sufficient exchange of $K^+$ ions for $Li^+$ ions to occur. By comparison, at temperatures of about 100° C. above the annealing point of the glass, an exposure period of one hour may be sufficient for the exchange of $K^+$ ions for $Li^+$ ions, with even shorter exposures being adequate with the $Na^+$ ion exchange. Normally, reaction temperatures higher than about 125° C. above the annealing point of the glasses will not be used inasmuch as thermal deformation of the glass body is seriously hazarded. Also, high temperatures increase the risk of glass surface attack by the external source of sodium and/or potassium ions. Consequently, in order to take advantage of the more rapid exchange, but avoiding the above problems at higher temperatures, our preferred practice contemplates temperatures of about 40°–100° C. above the annealing point of the glass.

Whereas any source of exchangeable sodium and/or potassium ions may be employed in accordance with known ion exchange practice, we have found baths of molten salts to be the most convenient for our purposes. Nitrate salts were commonly utilized although others, such as a molten mixture of $NaNO_3$-$Na_2SO_4$, molten $K_2Cr_2O_7$, or a molten mixture $KCl$-$K_2Cr_2O_7$, are also suitable. A bath of a molten mixture composed of 60% by weight $KNO_3$/40% by weight $NaNO_3$ has been found to be particularly desirable. That bath promotes the exchange of both $Na^+$ ions and $K^+$ ions with the $Li^+$ ions in the glass.

DESCRIPTION OF PREFERRED EMBODIMENTS

A series of samples embodying lens arrays was prepared in accordance with the procedure disclosed by Bellman et al. utilizing the same photonucleable, crystallizable, lithium silicate glass marketed by Corning Incorporated, Corning, New York, under Code 8603 used by Borrelli et al., that glass having the following composition, expressed in terms of parts by weight. (Because the sum of the individual constituents closely approximates 100, for all practical purposes the values listed may be deemed to represent weight percent.)

| $SiO_2$ | 79.1 | $Sb_2O_3$ | 0.4 |
|---|---|---|---|
| $Li_2O$ | 9.4 | Au | 0.0012 |
| $Na_2O$ | 1.6 | Ag | 0.115 |
| $K_2O$ | 4.2 | $CeO_2$ | 0.015 |
| $Al_2O_3$ | 4.2 | SnO | 0.003 |
| ZnO | 1.0 | | |
| Annealing Point | | 454° C. | |
| Strain Point | | 416° C. | |

Each sample was a glass strip having a thickness of about 0.24" ($\approx 6$ mm). To prepare for selected exposure to short wave radiation, one face of the strip was covered with a chrome dot mask. Each mask consisted of opaque dots imprinted in a transparent matrix. Each masked strip was subjected to ultraviolet radiation from an Oriel solar simulator for about 20 minutes. Thereafter, the strips were first heat treated at 560° C. for 30 minutes to further nucleate the exposed areas of the glass, and then the temperature was raised to 600° C. and held thereat for 30 minutes to cause the growth of crystals in those areas.

Examination of the strips showed an array of clear glass lens systems surrounded by an opaque matrix. Thus, rising slightly above the surface of the matrix were spherically-shaped protrusions on each end of a clear glass cylinder. These protrusions functioned as lenses, and the height thereof was measured on each specimen before further treatment as well as after. The variations in subsequent treatment conditions and the differences in height resulting therefrom are reported hereinafter.

The ion exchange reactions were conducted in baths of molten salts, which baths were contained in either VYCOR ® brand or PYREX ® brand glassware marketed by Corning Incorporated. The glass containers were placed inside stainless steel vessels to hold the molten salt in case of breakage. The VYCOR ® brand glassware was preferred because of its much lower coefficient of thermal expansion and absence of alkali metal ions which could enter and contaminate the bath from chemical attack of the glassware by the hot molten salt.

The ion exchange procedure utilized the following general steps:

(1) the sample was carefully cleaned;
(2) the sample was introduced into the furnace holding the salt bath which had been equilibrated at the desired ion exchange temperature and pre-heated therein for five minutes;
(3) the sample was thereafter immersed into the bath and maintained therein for a predetermined period of time; and then
(4) the sample was withdrawn from the bath, allowed to cool to room temperature, and carefully cleaned.

The surface relief of the reported samples was measured by means of a Dektak IIA surface profile measuring system marketed by Veeco Instruments, Sloan Technology Division, Santa Barbara, Calif. That unit acquires data by moving a sample beneath a diamond tipped stylus. Vertical movements of the stylus are sensed by an LVDT, digitized, and stored for display on a video screen.

Tables I and II record the initial height of the lens (in microns) and the increase in height exhibited thereby after ion exchange, as a function of exchange time and temperature, for two different lens diameter arrays. A bath of molten $KNO_3$ provided the source of exchangeable $K^+$ ions.

TABLE I

| (300 micron/500 micron hex pack) | | | | |
|---|---|---|---|---|
| Initial Height | Temp. °C. | Time Hrs. | Exchange Height | Height Increase |
| 10 | 500 | 16 | 24 | 14 |
| 11.5 | 525 | 4 | 25.5 | 14 |
| 11 | 550 | 1 | 24 | 13 |
| 11 | 550 | 2 | 31 | 20 |

TABLE II

| (165 micron Auto-Focus Array) | | | | |
|---|---|---|---|---|
| Initial Height | Temp. °C. | Time Hrs. | Exchange Height | Height Increase |
| 14.5 | 500 | 2 | 15 | 0.5 |
| 14 | 500 | 16 | 29 | 15 |
| 14 | 525 | 4 | 27 | 13 |
| 14 | 550 | 2 | 30 | 16 |

By comparison, Borrelli et al. disclosed several lens arrays utilizing Corning Code 8603 glass produced via selective radiation and heat treatment which were immersed for 16 hours at 425° C. ($\approx 9°$ C. above the strain point of the glass) in a bath of molten salt consisting of 60 weight % $KNO_3$, 40 weight % $NaNO_3$ or for 21 hours at 450° C. ($\approx 4°$ C. below the annealing point of the glass) in a bath of molten $KNO_3$. The lens power was measured both before the ion exchange reaction (the method of Bellman et al.) and after the ion exchange reaction, on both front and back surfaces. Table III records the results of the tests reported in terms of lens powers in diopters (front/back), as well as lens sizes, exchange temperature, and exchange times. Lens sizes are expressed, for example, as 300/400, which indicates that the lenses were 300 microns in diameter and were formed on 400 micron centers.

TABLE III

| | Temp. | Time | Lens Power (Diopters) | |
|---|---|---|---|---|
| Lens Size | (°C.) | (Hrs) | Before Exchange | After Exchange |
| 300/400 | 450 | 21 | 520/425 | 590/540 |
| 200/240 | 425 | 16 | 890/360 | 890/550 |
| 300/360 | 425 | 16 | 625/250 | 700/400 |
| 400/480 | 425 | 16 | 410/195 | 470/240 |

Table IIIA reports the same data, but the lens power is converted to axial height in microns above the surface of the sample. Also tabulated is the percent increase in axial height resulting from the ion exchange.

TABLE IIIA

| | Height | | % Height |
|---|---|---|---|
| Lens Size | Before Exchange | After Exchange | Increase |
| 300/400 | 5.8/4.8 | 6.6/6.0 | 14/25 |
| 200/240 | 4.5/1.8 | 4.5/2.7 | 0/50 |
| 300/360 | 7/2.8 | 7.8/4.5 | 11/61 |
| 400/480 | 8.2/3.9 | 9.4/4.8 | 15/23 |

As can be discerned from Table IIIA, the method of Borrelli et al. provided widely-varying changes in the axial height of the lenses ranging up to 15% on the front surface and up to 61% on the back side. In sharp contrast, the present inventive method provides lenses wherein the axial heights can be carefully controlled and which are in excess of 100% of those produced by Bellman et al. and at least about 50% greater than those developed by Borrelli et al.

Table IV reports the increase in height in microns of the lenses as a function of sample thickness (0.5 mm and 1.0 mm) utilizing arrays with lens diameters of 300 microns and baths of molten $KNO_3$ salt operating at a temperature of 550° C. The back of the sample was ground and polished to a plano surface.

TABLE IV

| | Initial Height | Exchange Height Front/Back | | Height Increase Front/Back | |
|---|---|---|---|---|---|
| Time Hrs. | Front/Back | 0.5 mm | 1 mm | 0.5 mm | 1 mm |
| 1 | 16.7/0 | 27.7/7 | 26.7/9 | 11/7 | 10/9 |
| 2 | 16.7/0 | 31.7/11.7 | 32.1/14.7 | 15/11.7 | 15.4/14.7 |
| 3 | 16.7/0 | — | 33.7/33.1 | — | 17/33.1 |

As can be seen from the above data, the present inventive ion exchange procedure enables a lens to be developed from the polished plano surface of the sample. Thus, lenses can be produced after a sample has been developed and finished to a desired surface.

Table V presents data measured on samples having a thickness of 0.030" ($\approx 0.8$ mm) wherein both the front and back sides thereof were ground and polished to a plano surface prior to the ion exchange reaction. Again, a bath of molten $KNO_3$ served as the source of $K^+$ ions.

TABLE V (160 micron/200 micron hex pack array)

| Temp °C. | Time Hrs. | Exchange Height (in microns) | |
|---|---|---|---|
| | | Front | Back |
| 550 | 1 | 8.6 | 8.6 |
| 550 | 2 | 11.1 | 11.1 |
| 550 | 2.5 | 13.5 | 13.4 |
| 550 | 3 | 14.6 | 14.4 |
| 550 | 4 | 16.8 | 16.6 |

As was observed by Bellman et al. and Borrelli et al., the basic technology permits the fabrication of lenses of cylindrical surface geometry. Prior to the present invention, however, the ability to produce cylindrical lenses was limited to small dimensions such as 0.1 mm×1 mm and smaller. Hence, when larger aspect ratios were attempted, negative curvatures resulted. Table VI illustrates the dramatic effect which the inventive ion exchange reaction can exert upon the development of cylindrical lenses. Thus, Table VI records the initial relief (in microns) of cylindrical lenses of various dimensions and the relief after an ion exchange reaction of three hours at 550° C. Yet again, a bath of molten $KNO_3$ provided the exchangeable $K^+$ ions.

TABLE VI

| Lens Dimensions | Initial Relief | Exchange Relief |
|---|---|---|
| 0.1 × 8 mm | −1.0 | 6.5 |
| 0.1 × 5 mm | −0.7 | 17.6 |
| 0.05 × 5 mm | −3.5 | 5.6 |
| 0.05 × 2.5 mm | −15.8 | 10.8 |
| 0.1 × 1 mm | 7.5 | 21.8 |

The dimensions of the spacing between adjacent lenses is also of significance in the formation of lens arrays. Experience has demonstrated that lens arrays prepared in accordance with Bellman et al. are limited by the need to have an adequate area of crystals around each lens to yield the desired relief. The need for the surrounding crystalline area is explained by Bellman et al. in terms of the mechanism underlying the development of the lenses. Thus, Bellman et al. attributed that need to the mechanical nature of the lens-producing effect; i.e., the surrounding crystalline area must squeeze the glass cylinders in order to cause the lenses to protrude above the surface.

Table VII provides a comparison of the effect on the height of lenses produced (in microns) exerted by the spacing between lenses (also in microns) between those lenses formed by Bellman et al. and those formed by the present invention. The sample strips used in the Bellman et al. technique had a thickness of about 0.135" ($\approx 3.4$ mm); the strips used in the present invention had a thickness of about 0.056" ($\approx 1.4$ mm).

Each strip was subjected to the same ultraviolet radiation exposure and heat treatment in accordance with Bellman et al. to develop lenses having diameters of about 300 microns. Thereafter, one set of strips was immersed for three hours into a bath of molten $KNO_3$ operating at 550° C. Table VII records the spacing between the lenses (in microns), the axial height of the lenses above each surface of the ion exchanged strips, and the height of the lenses rising above one surface of the strips not subjected to the ion exchange reaction.

TABLE VII

| Spacing | Lens Height No Exchange | Lens Height Ion Exchanged | |
|---|---|---|---|
| | | Top Surface | Bottom Surface |
| 5 | 4.2 | 9.6 | 10.2 |
| 15 | 11.4 | 11.9 | 11.8 |
| 25 | 15.1 | 12.0 | 12.4 |
| 35 | 16.8 | 12.8 | 12.9 |

As can be observed, the lens heights developed at small interlens spacings is much more consistent with the ion exchange practice of the instant invention than with the basic Bellman et al. process.

That capability permits lens arrays to be prepared in bodies of relatively thin cross section. Thus, as can be readily appreciated, inasmuch as the initial crystallization heat treatment utilized by Bellman et al. contemplates heat treatments far above the annealing point of the glass (typically about 150° C. above the annealing point), thermal deformation will be encountered in bodies of thin cross section. The present invention, however, enables one to apply the Bellman et al. technique to bodies of relatively thick cross section which can then be finished to a desired thinner cross section. Thereafter, these thinner bodies can be ion exchanged to develop lenses in the surfaces.

For example, plates about 4" square ($\approx 102$ mm) and of 5 mm thickness were subjected to the Bellman et al. process to produce a 160 micron/200 micron hex pack array. The top face of each plate was thereupon slightly ground and polished to remove the lens protuberances therefrom and the back face was ground and polished to an extent yielding a plate having a final thickness of 0.026" ($\approx 0.66$ mm). Thereafter, the plates were immersed for 5½ hours into a bath of molten $KNO_3$ operating at 525° C. (Although the bath was at a temperature about 75° C. above the annealing point of the glass, the buoyancy of the bath worked to reduce thermal deformation of the plates to a minimum.) Lens having axial heights of about 14 microns were developed on both faces of the plates. Subsequently, two plates were sealed together one atop the other with the lenses in alignment, thereby forming a laminated product comprising four operative lenses demonstrating optical properties suitable for use in an imaging device.

To illustrate the effectiveness of the exchange of $Na^+$ ions with $Li^+$ ions in the glass in producing lenses having high axial heights, the following experiments were conducted. Each sample was a glass strip of Corning Code 8603 glass having a thickness of about 0.24" ($\approx 6$ mm). The strips were selectively exposed to ultraviolet radiation by covering one face thereof with a chrome dot mask as noted above. Thereafter, the masked strips were exposed to ultraviolet radiation and then subjected to the two stage nucleation and crystallization heat treatment described above. The strips were thereafter ground and polished on both faces thereof to a thickness of 0.027" ($\approx 0.7$ mm), thereby removing the microlenses. The chrome mask was so selected that the resulting strips contained a plano/plano hex pack array pattern of 160 micron diameter glass cylinders on 195 micron centers in a crystalline surround.

The strips were subjected to the ion exchange procedure set out above and the surface relief of the exchanged samples measured utilizing the system described above. Table VIII reports the height of each lens (in microns) as a function of bath composition and exchange time, each bath being at a temperature of 500° C. The table provides a comparison of the increase in axial height of the lenses provided via a bath of molten NaNO$_3$, a bath of molten 60% by weight KNO$_3$/40 weight % NaNO$_3$, and a bath of molten KNO$_3$.

TABLE VIII

| Time (Hours) | NaNO$_3$ | 60/40 KNO$_3$/NaNO$_3$ | KNO$_3$ |
|---|---|---|---|
| 4 | 14.1 | 11.7 | 7.6 |
| 8 | 18.5 | 17.0 | 10.7 |
| 16 | 19.8 | 21.3 | 14.9 |
| 32 | 21.4 | 24.4 | 21.0 |
| 64 | 20.5 | 22.5 | 27.9 |

It is immediately evident that the presence of Na$^+$ ions significantly increases the initial rate at which the height of the lenses is generated. Thus, after the four and eight hour immersions, the NaNO$_3$ bath gave rise to heights almost twice those generated through immersions in the KNO$_3$ bath; the 60/40 KNO$_3$/NaNO$_3$ bath gave intermediate results. Nevertheless, as the exchange extends beyond eight hours, the advantage in using a Na$^+$ ion-containing bath diminishes; after an exchange time of 32 hours, the lens heights developed in the NaNO$_3$ and KNO$_3$ baths are virtually identical. Between eight and 16 hours the lens heights generated in the 60/40 KNO$_3$/NaNO$_3$ bath overtake those produced in the NaNO$_3$ and thereafter continue to develop greater relief. Finally, after very long immersion periods the lens heights developed in the KNO$_3$ bath outpace those generated in either of the other baths.

Microprobe elemental analyses of Na$^+$ ion exchanged samples and K$^+$ ion exchanged samples have provided data which, when combined with consideration of the relative sizes of the alkali metal ions, suggest an explanation for the above results. Table IX lists the relative sizes of the alkali metals, the ionic radius being expressed in terms of Angstrom Units.

TABLE IX

| Alkali Metal | Ionic Radius |
|---|---|
| Lithium | 0.60 |
| Sodium | 0.95 |
| Potassium | 1.33 |

The Na$^+$ ion exchanges much more rapidly with the Li$^+$ ions in the glass than does the K$^+$ ion. As a consequence, the Na$^+$ ions replace the Li$^+$ ions of the glass more quickly and more completely than do the K$^+$ ions, which then leads the glass to swell more rapidly to develop greater lens heights within short exchange times. Because of the larger size of the potassium ion, however, greater heights are ultimately obtainable through ion exchange with K$^+$ ions.

Not unexpectedly, the lens heights derived via exchange in the 60/40 KNO$_3$/NaNO$_3$ bath are intermediate between the baths of neat NaNO$_3$ and KNO$_3$. As was observed above, the initial development of surface relief is more rapid than in the K$^+$ ion exchange but slower than in the Na$^+$ ion exchange. The maximum lens heights are greater than those generated in the Na$^+$ ion exchange, but lower than those produced via the K$^+$ ion exchange. Those variations can be explained by attributing the initial greater development to the more rapid replacement of Li$^+$ ions by Na$^+$ ions, and the ultimately greater lens heights resulting from the longer term exchange of K$^+$ ions for Li$^+$ ions to the larger size of the potassium ion.

Based upon the several groups of exmaples recorded above, the most preferred temperatures for conducting the ion exchange reactions have been deemed to range between about 500°–550° C.

It will be appreciated that where a Na$^+$ ion exchange reaction is carried out on Corning Code 8603 glass, some exchange of Na$^+$ ions for K$^+$ ions in the surface of the glass will occur. The rate of this latter exchange is much slower than that taking place between the Na$^+$ ions and the Li$^+$ ions. Nevertheless, after a long period of reaction this exchange can become significant and may contribute to the decreased lens heights seen after long term immersions, because of the replacement of larger K$^+$ ions with smaller Na$^+$ ions.

Likewise, where a K$^+$ ion exchange reaction is conducted on Corning Code 8603 glass, some exchange of K$^+$ ions for Na$^+$ ions in the glass surface will take place. Again, the rate of reaction is slower than that exhibited in the K$^+$ ion-for Li$^+$ ion exchange, but its effect (replacement of smaller Na$^+$ ions with larger K$^+$ ions) may supplement the increased lens heights observed after long term immersions.

However, the effect of either of the above reactions upon lens heights has been adjudged to be small compared to the primary Na$^+$ ion and/or K$^+$ ion-for Li$^+$ ion exchange, and the occurrence of either is unnecessary to achieve the purpose of the invention. Stated in another manner, neither reaction is required in the invention and quite evidently could not occur where the glass composition is free of Na$_2$O and/or K$_2$O.

The above examples clearly demonstrate the advantages which the present invention imparts to the final lens arrays, as compared to those produced by Bellman et al. and Borrelli et al. Hence, the above groups of examples illustrate that the value of the instant invention is sixfold:

(1) it enables the production of lens arrays of much greater axial height;

(2) double convex arrays can be fabricated in full size format, neither face having been disturbed by surface contact during lens development;

(3) cylindrical surface geometry lens structures can be fabricated with high curvatures and a variety of dimensions;

(4) lenses can be developed on one plano surface or on both plano surfaces of thin substrates; and, therefore, (5) the substrate for a lens array can be finished to a desired thickness, before the lenses are developed, and this thickness may be less than previously possible; which capability (6) enables the production of optical devices of very thin cross section; and (7) the formation of improved optical devices comprising laminates of optical devices described in (6).

The slower rate of exchange taking place between K$^+$ ions and Li$^+$ ions permits very precise control of lens height to be secured and, of course, an ultimately greater lens height when that is desired. Nevertheless, where numerous lens arrays of essentially identical lens heights are to be produced (and that lens height is within the capability of the Na$^+$ or K$^+$/Na$^+$ ion exchange), their more rapid exchange rates recommend their use in those applications.

We claim:

1. In a method for making an optical device wherein a photonucleable, lithium silicate glass body is selectively crystallized to provide a crystalline matrix surrounding each lens in an array of spherically-shaped clear lenses integral with and rising above at least one matrix surface wherein sodium and/or potassium ions from an external source are exchanged for lithium ions within the surface of said clear lenses to create variable alkali metal ion concentrations defined by both radial and axial concentration gradients, the improvement comprising conducting said exchange of sodium and/or potassium ions for lithium ions at a temperature between about 25°–125° C. above the annealing point of said glass for a period of time sufficient to produce lenses which in diameters of 1 mm and larger have axial heights in excess of 20 microns.

2. A method according to claim 1 wherein said exchange is conducted at a temperature between about 40°–100° C. over the annealing point of said glass.

3. A method according to claim 1 wherein said exchange is effected in a bath of a molten sodium and/or potassium salt.

4. A method according to claim 1 wherein said exchange is conducted at a temperature between about 500°–550° C.

5. A method according to claim 1 wherein, prior to said ion exchange, one surface of said glass body is finished to a plano surface whereby said ion exchange produces lenses on one surface of said glass body having an axial height different from lenses produced on the other surface of said glass body.

6. A method according to claim 1 wherein, prior to said ion exchange, both surfaces of said glass body are finished to plano surfaces whereby said ion exchange produces lenses of essentially equal axial height on both surfaces of said glass body.

7. An optical device composed of an array of spherically-shaped clear lenses integral with and rising above at least one surface of a selectively crystallized, photonucleable lithium silicate glass body made in accordance with the method of claim 1.

8. An optical device according to claim 7 consisting of a laminate of lens arrays.

9. In a method for making an optical device wherein a photonucleable, lithium silicate glass body is selectively crystallized to provide a crystalline matrix surrounding each lens in an array of clear lenses of cylindrical surface geometry integral with and rising above at least one matrix surface wherein sodium and/or potassium ions from an external source are exchanged with lithium ions within the surface of said clear lenses to create variable alkali metal ion concentrations defined by both radial and axial concentration gradients, the improvement comprising conducting said exchange of sodium and/or potassium ions for lithium ions at a temperature between about 25°–125° C. above the annealing point of said glass for a period of time sufficient to produce lenses of cylindrical surface geometry which in lengths longer than 1 mm and in length to width aspect rations greater than 10:1 exhibit positive curvatures.

10. A method according to claim 9 wherein said exchange is conducted at a temperature between about 40°–100° C. over the annealing point of said glass.

11. A method according to claim 9 wherein said exchange is effected in a bath of a molten sodium and/or potassium salt.

12. A method according to claim 9 wherein said exchange is conducted at a temperature between about 500°–550° C.

13. A method according to claim 9 wherein, prior to said ion exchange, one surface of said glass body is finished to a plano surface whereby said ion exchange produces lenses on one surface of said glass body having an axial height different from lenses produced on the other surface of said glass body.

14. A method according to claim 9 wherein, prior to said ion exchange, both surfaces of said glass body are finished to plano surfaces whereby said ion exchange produces lenses of essentially equal axial height on both surfaces of said glass body.

* * * * *